United States Patent

Molva et al.

[11] Patent Number: 5,889,798
[45] Date of Patent: Mar. 30, 1999

[54] ACTIVE-SWITCHING LASER AND MICROCHIP LASER

[75] Inventors: Engin Molva, Grenoble; Philippe Thony, La Buisse, both of France

[73] Assignee: Commissariat a l'Energie Atomique, Paris, France

[21] Appl. No.: 860,756

[22] PCT Filed: Jan. 23, 1996

[86] PCT No.: PCT/FR96/00106

§ 371 Date: Aug. 11, 1997

§ 102(e) Date: Aug. 11, 1997

[87] PCT Pub. No.: WO96/23335

PCT Pub. Date: Aug. 1, 1996

[30] Foreign Application Priority Data

Jan. 24, 1995 [FR] France .................................. 95 00764

[51] Int. Cl.⁶ ........................................................ H01S 3/10
[52] U.S. Cl. ........................ 372/12; 372/21; 372/37; 372/92; 372/95; 372/99; 372/105
[58] Field of Search ............................. 372/9, 10, 11, 372/12, 13, 92, 95, 107

[56] References Cited

U.S. PATENT DOCUMENTS

| | | | |
|---|---|---|---|
| Re. 34,812 | 12/1994 | Zayhowski ................................ | 372/10 |
| 4,982,405 | 1/1991 | Zayhowski et al. ...................... | 372/10 |
| 5,048,051 | 9/1991 | Zayhowski .............................. | 372/101 |
| 5,132,977 | 7/1992 | Zayhowski et al. ...................... | 372/10 |
| 5,311,280 | 5/1994 | Koper et al. ............................ | 372/107 |
| 5,502,737 | 3/1996 | Chartier et al. ........................... | 372/11 |
| 5,732,100 | 3/1998 | Thony et al. ............................. | 372/92 |

OTHER PUBLICATIONS

MacKinnon, et al., Pump Power Induced Cavity Stability in Lithium Neodymium Tetraphosphate (LNP) Microchip Laser, Apr. 27, 1992, Optics Communications 94 (1992), pp. 281–288.

Lee, et al., Observation of Optical Bistability Due to Resonator Configuration Transition, Optics Letters, vol. 10, No. 5, May 1985, pp. 232–234.

Il'ichev, et al., Laser With Diffraction–Limited Divergence and Q Switching by Stimulated Brillouin Scattering, Sov. J. Quantum Electron, 12(9), Sep. 1982, pp. 1161–1164.

Zayhowski, et al., Diode–Pumped Microchip Lasers Electro–Optically Q Switched at High Pulse Repetition Rates, Optics Letters, 17(1992), Sep. 1, No. 17, New York, NY, pp. 1201–1203.

Koechner, *Solid–State Laser Engineering,*, pp. 437–442 no date.

Lee Smith, *Handbook of Laser Science and Technology,* vol. 3, Part 1, pp. 259–281, vol. 4, Part 2, pp. 253–317 no date.

*Primary Examiner*—James W. Davie
*Attorney, Agent, or Firm*—Burns, Doane, Swecker & Mathis LLP

[57] ABSTRACT

The invention relates to a laser cavity having an active laser medium and two mirrors forming a Fabry-Perot cavity, characterized in that the cavity is at the optical stability limit and in that there are means for varying the optical length of the cavity, so as to pass from an optically unstable state into a stable state.

15 Claims, 6 Drawing Sheets

ACTIVE-SWITCHING LASER AND MICROCHIP LASER

DESCRIPTION

1. Technical Field

The invention relates to the field of lasers and in particular actively switched, solid microlasers.

The main advantage of the microlaser is its structure in the form of a stack of multilayers, which constitutes its essential feature. The active laser medium is constituted by a material of limited thickness between 150 and 1000 μm and of small size (a few mm²), on which are directly deposited dielectric cavity mirrors. This active medium can be pumped by a III–V laser diode, which is either directly hybridized on the microlaser, or is coupled to the latter by an optical fibre. The possibility of a collective production using microelectronics means allows mass production of such microlasers at a very low cost.

Microlasers have numerous applications in fields as varied as the car industry, the environment, scientific instrumentation and telemetry.

2. Prior Art

Known microlasers generally have a continuous emission of a few dozen mW power. However, most of the aforementioned applications require peak powers (instantaneous power) of a few kW supplied for $10^{-8}$ to $10^{-9}$ seconds with a mean power of a few dozen mW.

In solid lasers, it is possible to obtain such high peak power levels by making them operate in the pulsed mode at frequencies between 10 and $10^4$ Hz. For this purpose use is made of cavity switching methods, such as Q-switching. Such methods applicable to lasers in general are described by N. Koechner "Solid state laser engineering", Springer Verlag, 1988.

A cavity can be actively or passively switched. In the case of passive switching, variable losses are introduced into the cavity in the form of a saturable absorber material. In the case of active switching, the value of the losses is controlled externally by the user, e.g. by a rotary cavity mirror, by acoustooptical or electrooptical, intracavity means changing either the path of the beam, or its polarization state. The storage time, the opening time of the cavity and the repetition rate can be independently chosen.

Figure 1:
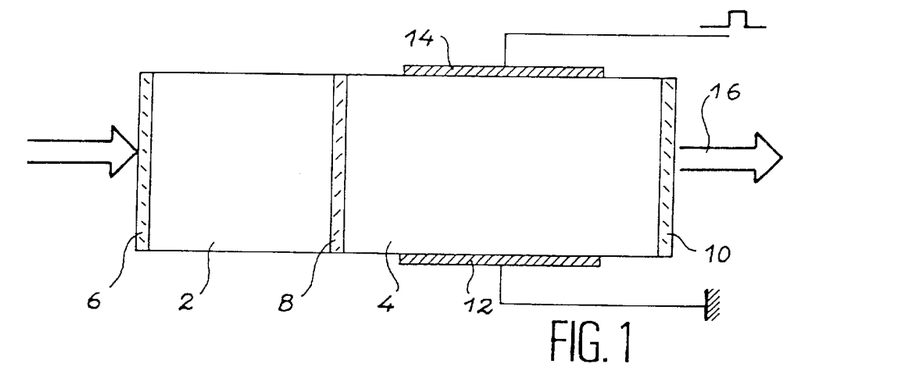
FIG. 1 A laser switched by an optooptical material according to the prior art.

U.S. Pat. No. 5,132,977 and U.S. Pat. No. 4,982,405 describe actively switched lasers. In these documents, switching takes place in a configuration of two coupled Fabry-Perot cavities. Such an assembly is illustrated in FIG. 1, where reference 2 designates the active laser medium, 4 a switching material, e.g. an electrooptical material such as $LiTaO_3$. The active medium 2 of the laser forms with an input mirror 6 and an intermediate mirror 8 a first Fabry Perot cavity. The switching material forms with the intermediate mirror 8 and the output mirror 10 a second Fabry Perot cavity. The switching material 4 can e.g. be bonded to the surface of the intermediate mirror 8. The two cavities are coupled. Switching can take place by modifying the optical length of the switching material 4 by an external action. On designating as $L_1$, $n_1$, $\lambda_1$ (respectively $L_2$, $n_2$, $\lambda_2$) the length, optical index and optical resonance wavelength of the first cavity (respectively the second cavity), the following relation exists: $m_1\lambda_1=2n_1L_1$ and $m_2\lambda_2=2n_2L_2$ with $m_1$ and $m_2$ being integers.

If the material 4 is a electrooptical material, switching electrodes 12, 14 are placed perpendicular to the axis of the laser beam 16 on either side of the switching material 4. If a voltage V is applied between these electrodes, an electric field E=V/e, where e is the distance between the electrodes (corresponding to the electrooptical material thickness) is the result. The optical index $n_2$ and consequently the optical length $n_2L_2$ of the electrooptical material is modified by the action of the field E. This affects the coupling of the two cavities and modifies the reflectivity of the intermediate mirror 8 seen by the laser medium. Thus, if the resonance wavelengths of the two cavities coincide ($\lambda_1=\lambda_2$ or $n_1L_1/n_2L_2=m_1/m_2$), the reflectivity of the second cavity (electrooptical) seen by the first cavity (laser material) will be at a minimum and there will be no laser action. Thus, by acting on the field E, it is possible to modify the resonance conditions of the laser and therefore the reflectivity of the second cavity and active switching can be carried out.

Figure 2A:
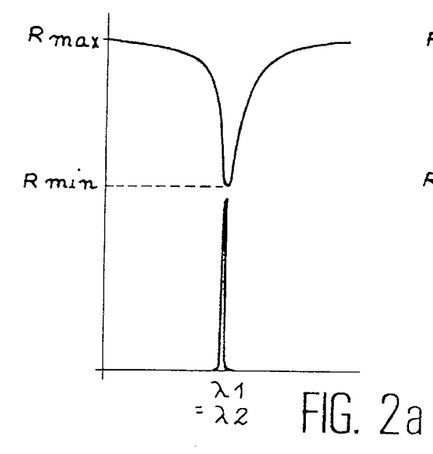
FIGS. 2a & 2b For a prior device, give the relative positions of the laser line and a mode of the cavity constituted by the switching material.
Figure 2B:
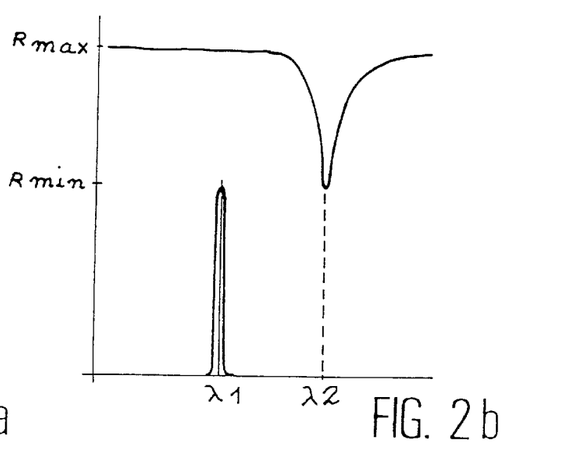

The two states corresponding to a minimum or maximum reflectivity of the second cavity are illustrated in FIGS. 2a and 2b. In the latter the curve in the upper part gives the reflectivity of the second cavity as a function of the wavelength, the laser line being represented in the lower part. FIG. 2a corresponds to the case where the reflectivity of the second cavity is at its minimum value $R_{min}$ at the resonance wavelength of the first cavity $\lambda_1$. FIG. 2b corresponds to the case where the resonance wavelengths of the two cavities are no longer identical ($\lambda_1\neq\lambda_2$) and where the second cavity has a maximum reflectivity $R_{max}$ at the wavelength $\lambda_1$.

In the case of the laser in general, the double cavity structure described hereinbefore and its operating principle are of a complex nature and one problem to be solved is the deposition of a new type of actively switched laser having a simpler structure.

All this more particularly applies to microlasers. A microlaser having this structure is described in the article by J. J. Zaybowski et al. entitled "Diode-pumped microchip lasers electrooptically Q-switched at high pulse repetition rates", in Optics Letters, vol. 17, No. 17, pp 1201–1203, 1992. For a YAG:Nd microlaser emitting at 1.06 μm, the second material 4 being constituted by $LiTaO_3$ of approximate thickness 1 mm, we obtain e.g.: $n_1=1.8$, $n_2=2$, $L_1=500$ μm, $L_2=900$ μm. The maximum reflectivity variation of the second cavity is obtained approximately for $d\lambda/\lambda=dL_2/L_2=dn_2/n_2=10^{-4}$. This index variation can be obtained by applying an electric field of approximately $10^4$ V/cm to the switching material.

Figure 3:
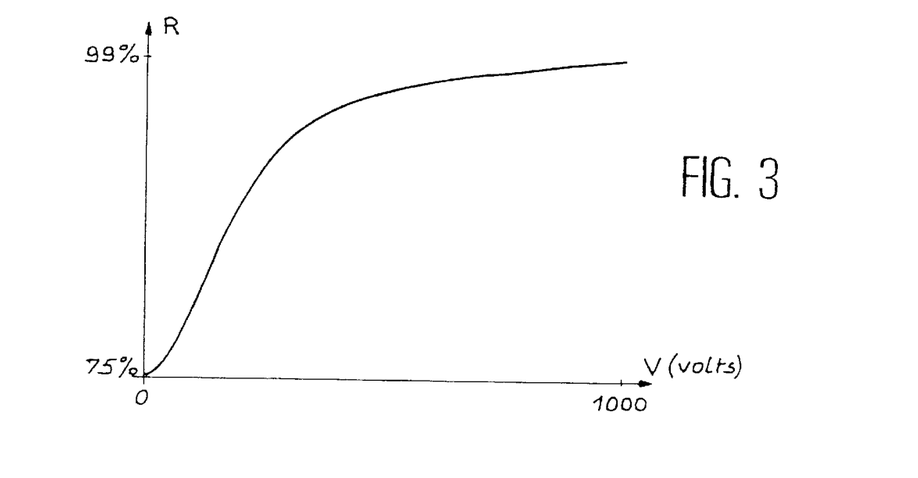
FIG. 3 The reflectivity of the second cavity seen by the active laser medium of the first cavity in a microlaser switched according to the prior art.

The second, electrooptical cavity can be likened to an output mirror of the first cavity constituted by the laser material. The reflectivity of this output mirror is variable and controlled by the external control voltage applied to the electrodes 12, 14. FIG. 3 shows for a microlaser the variation of the reflectivity R of the second cavity as a function of the voltage V applied. For the case where the three mirrors 6, 8, 10 have reflectivities of respectively 99%, 95% and 50%, the reflectivity of the second cavity will vary between 75 and 99%. Thus, for the active medium this amounts to varying the reflectivity of the output mirror between 75 and 99% by an external voltage control. Thus, according to the diagram of FIG. 3 it is necessary to apply several hundred volts in order to obtain a reflectivity close to 90% and approximately 1000 volts to obtain a reflectivity of approximately 99% for an interelectrode distance of 1 mm. As the voltage also has to be applied in a very short time (<1 ns), a sophisticated electronics is required, which is incompatible with the simplicity and low cost required for microlasers.

DESCRIPTION OF THE INVENTION

The invention firstly relates to an actively switched laser cavity, but which has a much simpler structure than the known, actively switched lasers. Thus; the laser cavity according to the invention solves the problem of the complexity of known laser structures operating in the active mode.

More specifically, the invention relates to a laser cavity having an active laser material and two mirrors forming a Fabry Perot cavity, characterized in that the cavity is at the optical stability limit and in that means are provided for varying the optical length of the cavity so as to pass it from an optically unstable state to an optically stable state.

Thus, a new active switching is carried out, because the optically unstable state is a state with high cavity losses, as opposed to the optically stable state.

Moreover, the structure obtained is radically different from that obtained according to U.S. Pat. No. 4,982,405 and U.S. Pat. No. 5,132,977, because there is now only one Fabry Perot cavity.

The cavity can be a hemispherical, confocal, concentric or spherical cavity.

According to a special embodiment, apart from an active material, the cavity has a second variable optical length material. However, this still only requires a single Fabry Perot cavity and not two as in the prior art. The two materials can be juxtaposed, or bonded with one another, or can be in contact with one another by molecular adhesion. An antireflection layer can be deposited at the interface of the two materials. This gives a very compact, monolithic structure.

The means for varying the optical length of the cavity can incorporate means for varying the length of the second material.

According to another embodiment, the optical indices of the two materials are different and the means for varying the optical length of the cavity can then be means for varying the optical index of the second material.

The second material can be an electrooptical material, or a material whose index varies as a function of the temperature or pressure, or a magnetooptical material, or an optically non-linear material.

For varying the optical length of the laser cavity, it is also possible to vary its length, by fitting one of the mirrors to a piezoelectric device permitting the oscillation of said mirror between a position in which the optical cavity is unstable and a position in which the optical cavity is stable.

A laser cavity like that described hereinbefore can also be a microlaser cavity.

Thus, a single microlaser cavity is produced and its optical length modified in order to displace the cavity from the high loss, unstable range to the low loss, stable range, which permits the switching thereof. It is only necessary to have a single Fabry Perot cavity, even if it contains two materials, whereof one material is the active laser material and the other is a material of optically variable length.

When the two materials are juxtaposed, bonded or adhere to one another by molecular adhesion, the compactness of the system is improved, which is very important in the case of a microlaser. If the cavity is a hemispherical, confocal, concentric or spherical cavity, the size of the beam in the cavity is smaller and it is then possible to reduce the thickness of the materials used. The microlaser size is consequently further reduced. This makes it possible to solve on the problems mentioned hereinbefore, namely that of the high voltage value to be applied if the second material is an electrooptical material. Thus, as the thickness of the latter decreases, the same electric field is obtained for a lower voltage ($\vec{E}=\Delta V/e$, in which e is the thickness between the electrodes).

Finally, a laser or microlaser can have a cavity like that described hereinbefore and optical cavity pumping means.

BRIEF DESCRIPTION OF THE DRAWINGS

The invention is described in greater detail hereinafter relative to non-limitative embodiments and with reference to the attached drawings, wherein show.

DETAILED DESCRIPTION OF EMBODIMENTS OF THE INVENTION

Figure 4:
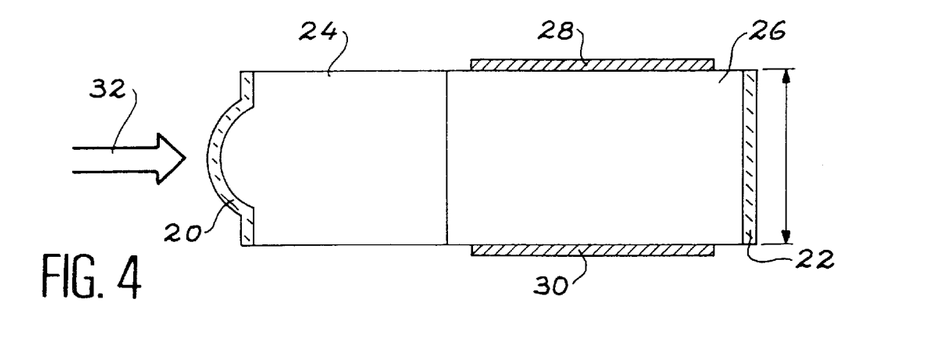
FIG. 4 The cavity of a laser or a microlaser switched according to the invention.

The invention will firstly be described in conjunction with a special embodiment and FIG. 4. FIG. 4 shows the laser or microlaser cavity constituted by an input mirror 20, an output mirror 22, between which there is an active laser medium 24 (e.g. YAG:Nd) and an electrooptical medium 26 (e.g. LiTaO$_3$). The latter is itself located between two electrodes 28, 30. These two electrodes are connected to not shown means for establishing between them a voltage difference $\Delta V$, leading to the creation of an electric field $E=\Delta V/e$ within the medium 26, where e represents the thickness of said medium. The media 24 and 26 are in contact with one another and an antireflection layer can be deposited at the interface 24–26. The active laser medium 24 is pumped by a pumping beam 32, e.g. a beam of a laser diode at 808 nm. The input and output mirrors can be chosen so as to have, for the input mirror, a maximum reflectivity at the wavelength of the laser beam (1.06 μm if the medium 24 is of the YAG:Nd type) and the highest possible transmission coefficient at the wavelength of the pumping beam (e.g. R=99.5% at 1.06 μm and T>80% at 808 nm). The output mirror can be chosen so as to have a high reflection coefficient at the wavelength of the laser beam (e.g. R=85 to 99% at 1.06 μm if the medium 24 is of the YAG:Nd type) and a high reflection coefficient at the wavelength of the pumping beam (e.g. R>80% at 808 nm).

The cavity shown in FIG. 4 is a hemispherical cavity at the stability limit. There is only a single cavity produced with two different materials, namely a laser material and another material, whose optical index can be varied by an external control voltage. Unlike in the case of the two coupled cavities described in the prior art, the two materials form a single Fabry Perot cavity. Thus, at the interface of the two materials, an antireflection layer can be provided at the wavelength of the laser and there is no intermediate mirror. The two materials 24 and 26 can be in contact by bonding or molecular adhesion. At the junction of these two materials there can be a low reflectivity of a few % due to optical index differences of the two materials, but this low reflectivity does not make it possible to obtain an adequate resonance to couple the two cavities in resonance, as in the prior art systems described.

Figure 5:
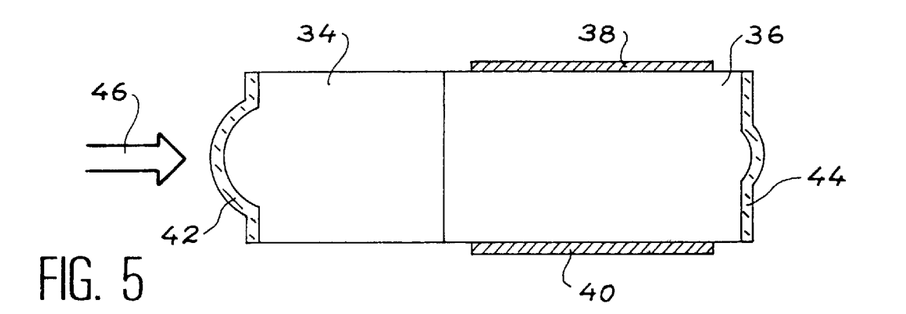
FIG. 5 Another embodiment of a cavity of a laser or microlaser switched according to the invention.

FIG. 5 shows another embodiment of a laser or microlaser cavity according to the invention. The media 34 and 36 have the same functions as the media 24 and 26 of FIG. 4, the medium 34 being a laser material of index $n_1$ and length $L_1$ and the material 36 an electrooptical material of index $n_2$ and length $L_2$. This material 36 is located between two contact electrodes 38 and 40. The cavity is confocal, sealed by an input mirror 42 (radius of curvature $R_1$ and diameter $\Phi_1$) and an output mirror 44 (of radius of curvature $R_2$ and diameter $\Phi_2$). The laser material is pumped by a pumping beam 46. Here again, the two materials 36 and 34 are in contact with one another in the same way as the materials 26 and 24 in FIG. 4.

It is then necessary to determine the characteristics of the mirror so as to produce a cavity, e.g. confocal (with two concave mirrors, as in FIG. 5) or hemispherical (planoconcave, as in FIG. 4), at the stability limit.

Figure 6A:
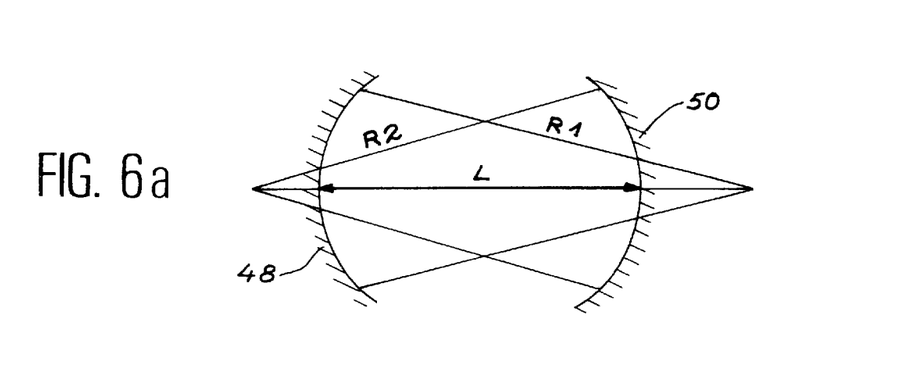
FIG. 6a & 6b An optical cavity limited by two mirrors.

In general terms, on considering as in FIG. 6a, two mirrors 48, 50 each having a radius of curvature $R_1$, $R_2$ separated by a distance L and with the cavity empty or containing a single optical medium of index n, the two characteristic cavity parameters are defined by:

$$g_1=1-L/R_1 \text{ and } g_2=1-L/R_2.$$

The stability range of the cavity is given by the relation $0<g_1g_2<1$ ($g_1$ and $g_2$ having the same sign).

Figure 6B:
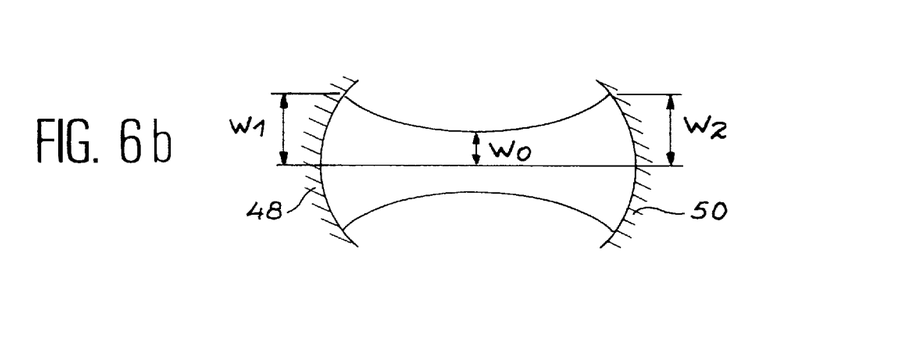

Moreover, on defining in conjunction with FIG. 6b, the sizes of the input and output beams and the intracavity laser beam respectively as $w_1$, $w_2$ and $w_0$, the following relations are obtained in which $\lambda$ defines the wavelength:

$$w_1^2=(\lambda \cdot L)/(\pi \cdot g_1) \cdot (g_1g_2)^{1/2}(1-g_1g_2)^{-1/2}$$

$$w_2^2=(\lambda \cdot L)/(\pi \cdot g_2) \cdot (g_1g_2)^{1/2}(1-g^1g^2)^{-1/2}$$

$$w_2^0=(\lambda \cdot L)/(\pi) \cdot (g_1g_2)^{1/2}(1-g_1g_2)^{1/2} \cdot (g_1+g_2-2g_1g_2)^{-1/2}$$

The resonance wavelengths of the cavity are given by the equation:

$$2nL=\lambda(q+(S+1)/\pi \cdot \arccos (g_1g_2)^{1/2}$$

where q and S are integers.

The stability limit cases are given by: $g_1g_2=1$ or $g_1g_2=0$.

The cavity sensitivity at variations of $g_1$ and $g_2$ is given by:

$$dw_1/w_1=(dg_1/4g_1) \cdot (2g_1g_2-1)/(1-g_1g_2)$$

$$dw_2/w_2=(dg_2/4g_2) \cdot (2g_1g_2-1)/(1-g_1g_2)$$

The minimum sensitivity is obtained for $g_1g_2=\frac{1}{2}$, in which case dw tends towards 0 (this is e.g. the case for the planoconcave cavity: $R_2=\infty$, $g_2=1$; $R_1=2L$, $g_1=\frac{1}{2}$).

The maximum sensitivity is obtained for $g_1g_2=1$ (planeparallel, concentric or spherical configuration), where $g_1=0$ and/or $g_2=0$ (hemispherical or confocal configuration), i.e. at the limits of the stability range, in which case dw tends towards infinity.

Figure 7:
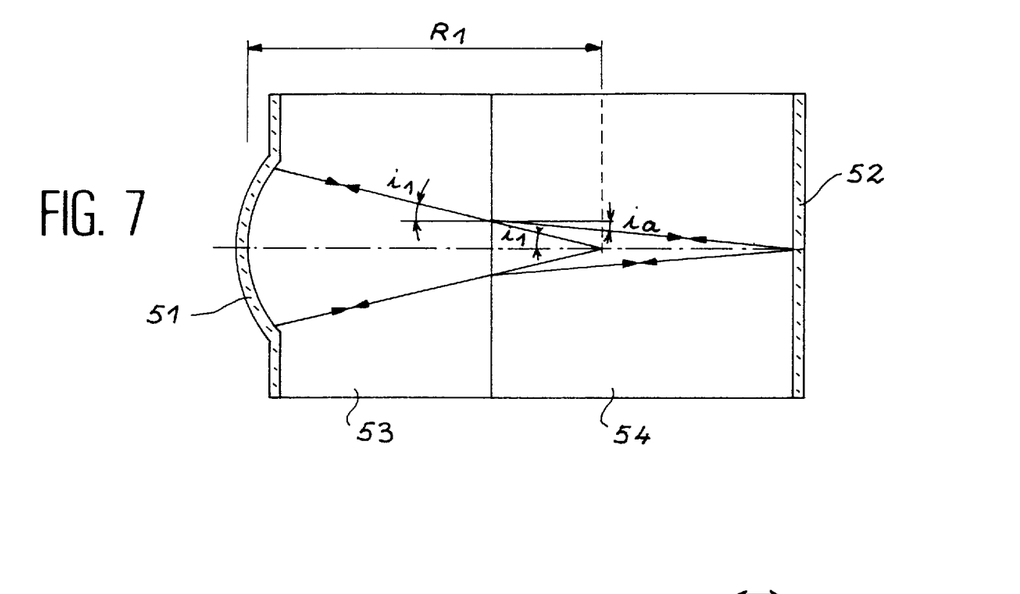
FIG. 7 A laser cavity switched according to the present invention and the propagation of the light beams within the cavity.

In the case of the cavity according to the invention, the cavity can be in two parts with two different optical indices $n_1$ and $n_2$. The case of a planoconcave cavity (hemispherical cavity) at the stability limit is illustrated in FIG. 7. The cavity is sealed by the two mirrors 51, 52. The mirror 51 has a radius of curvature $R_1$. The medium 53 of index $n_1$ and length $L_1$ is the active laser medium. The medium 54 has an index $n_2=n_1$ and a length $L_2$ and is juxtaposed with the medium 53, e.g. by bonding or molecular adhesion.

Following a very simple calculation using the notations given in FIG. 7, it is possible to demonstrate that:

$$n_1 \sin i_1 = n_2 \sin i_2 \ (n_1i_1=n_2i_2 \text{ for small angles})$$

$$L_2 \tan i_2 = (R_1-L_1) \tan i_1 \ (L_2i_2=(R_1-L_1)i_1 \text{ for small angles}).$$

Thus, we obtain for small angles: $n_1L_2=n_2(R_1-L_1)$.

Thus, the stability of such a planoconcave cavity is expressed by:

$$n_2R_1 \geq n_2L_1+n_1L_2 \text{ or } R_1 \geq L_1+(n_1/n_2)L_2 \text{ or } R_1 \geq L+(n_1/n_2-1)L_2.$$

Thus, it is possible to define the parameter:

$$g_1=1-(n_1L_2+n_2L_1)/(n_2R_1)=1-L/R_1-(n_1/n_2-1)L_2/R_1.$$

Symmetrically, in the case of two mirrors, each having a radius of curvature $R_1$, $R_2$, the parameter is also defined:

$$g_2=1-(n_1L_2+n_2L_1)/n_1R_2)=1-L/R_2-(n_2/n_1-1)L_1/R_2.$$

Thus, it is possible to consider that all cavities are planospherical (i.e. hemispherical) and spherical-spherical (i.e. confocal, concentric or spherical) designed at the stability limit, where the cavity sensitivity is at a maximum, which leads to the following cases:

case of a hemispherical cavity ($g_1=0$, $g_2=1$):

$$R_2=\infty, \ R_1=L_1+(n_1/n_2)L_2,$$

case of the confocal cavity ($g_1=g_2=0$):

$$R_1=L_1+(n_1/n_2)L_2, \ R_2=L_2+(n_2/n_1)L_1, \text{ which gives } R_2/R_1=n_2/n_1,$$

case of the concentric or spherical cavityl ($g_1g_1=1$):

$$n_1R_2+n_2R_1=n_1L_2+n_2L_1.$$

In the case of the hemispherical cavity, the stability will be obtained for $R_1 \geq L+(n_1/n_2-1)L_2$, with $L=L_1+L_2$.

In the case of the confocal cavity, the stability is obtained for:

$$R_1 \geq L+(n_1/n_2-1)L_2$$

$$R_2 \geq L+(n_2/n_1-1)L_1$$

Finally, for the concentric or spherical cavity, the condition relative to the stability is:

$$R_1 \geq \frac{L}{2} + \left(\frac{n_1}{n_2} - 1\right)\frac{L_2}{2}$$

$$R_2 \geq \frac{L}{2} + \left(\frac{n_2}{n_1} - 1\right)\frac{L_2}{2}$$

In each case, it is possible to vary either the index $n_2$, or the index $n_1$, or one of the lengths $L_1$ or $L_2$ so as to satisfy the corresponding inequation in order to bring the cavity into a stable state. The variation of one of these parameters is obtained by external control means. As the optically stable state of the cavity also corresponds to a low loss state and the optically unstable state to a high loss state, this provides a new means for actively switching a cavity.

Figure 8:
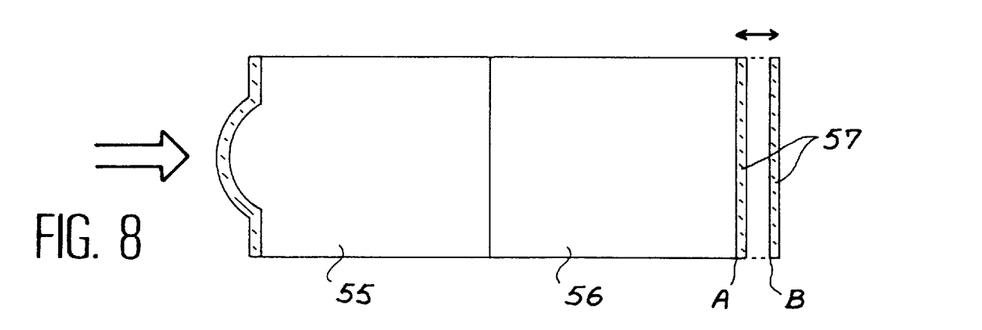
FIGS. 8 to 10 Other embodiments of a laser according to the invention.

It is therefore possible to e.g. fit the output mirror to a piezoelectric device permitting a modulation of its position and therefore of the length $L_2$ of the medium of index $n_2$. This is illustrated in FIG. 8, where the reference 55 designates an active laser material of index $n_1$, reference 56 a fixed medium of index $n_2$ (but differing from $n_1$) and where the position of the output mirror 57 of a hemispherical cavity is modified from a position A where the cavity is optically stable to a position B where the cavity is optically unstable.

Alternatively, it is possible to use as the medium of index $n_2$ an electrooptical medium, whose index is modulated by the application of an electric field, which is described in conjunction with FIGS. 4 and 5.

Figure 9:
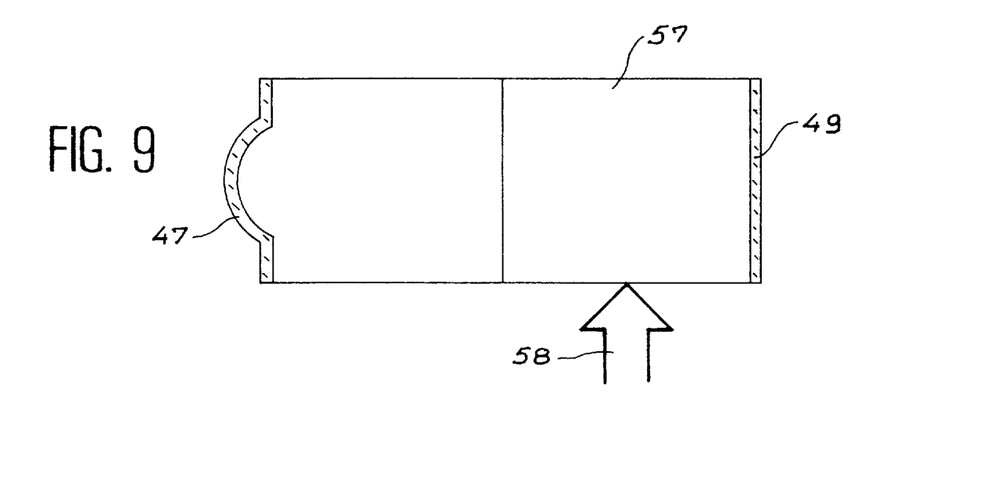

As illustrated in FIG. 9, it is also possible to use as the medium of index $n_2$, a non-linear material 57 pumped by a second laser beam 58 directed onto said material. The value of the index $n_2$ is modulated by pumping. Such non-linear materials are described in "Handbook of laser science and technology", vol. 3, part 1, section 1, CRC Press, 1986. The modification of the index of the medium of index $n_2$ leads to a modification of the optical length of the single cavity between the input 47 and output 49 mirrors and therefore on passing from an unstable position to an optically stable position or vice versa leading to the switching of the cavity.

Figure 10:
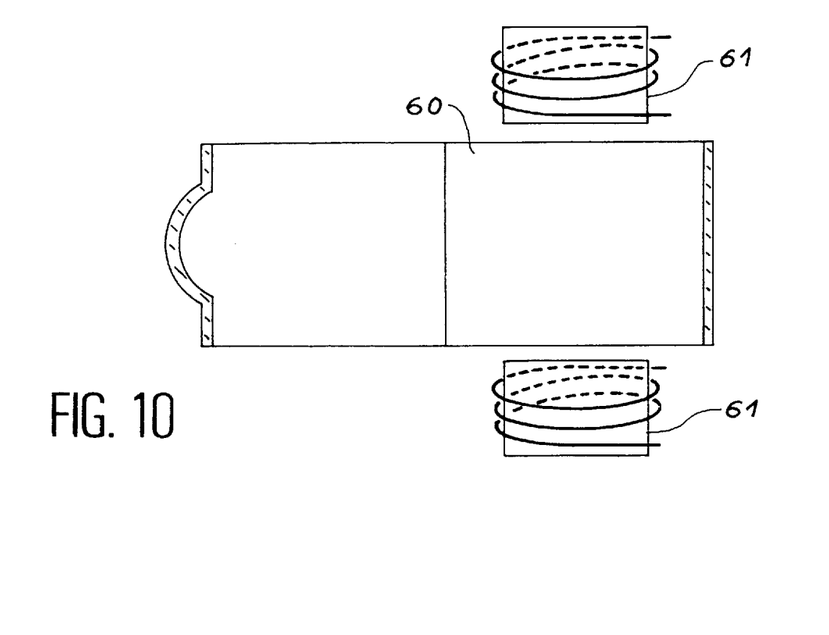

It is also possible to use as the medium of index $n_2$, a magnetooptical medium 60 (cf. FIG. 10), whose index $n_2$ is modified in response to an external magnetic field. For example, it is possible to use for changing the index $n_2$ an electromagnet 61 in the vicinity of the material of index $n_2$. Materials having this property are described in "Handbook of laser science and technology", vol. 4, part 2, section 2, CRC Press, 1986.

Moreover, the temperature can be used for modulating the optical length of the laser cavity. Thus, numerous materials undergo a length variation with a temperature variation.

According to another embodiment, the pressure can also make it possible to modify the optical length in the cavity, certain materials having an index $n_2$ which is dependent on the pressure.

According to another variant, it is also possible to modify the parameters ($n_1$, $L_1$) of the active laser material by electrical, thermal or mechanical means. For example, it is possible to modify the length $L_1$ by modifying the position of the input mirror fitted to piezoelectric means. In the case of acting solely on the index $n_1$ of the laser material (certain materials used as the matrix for the active laser medium, such as YAG, have electrooptical properties), it is necessary to keep in the cavity a second medium of index $n_2$, different from $n_1$, so that any index modification influences the optical length modification.

In the case of only modifying the total length of the optical cavity and not the indices, it is possible to only have a single laser medium of $n_1$ within the cavity, without a second medium of index $n_2$. In such a case, the active mode cavity switching system is greatly simplified compared with the known systems. There is consequently no need to have a second material, such as e.g. an electrooptical material.

Through using a hemispherical, confocal, concentric or spherical cavity, it is possible to concentrate the laser beam within the electrooptical material, as can be seen in FIG. 7. As the cross-section of the laser beam is reduced, it is possible to reduce the thickness of the material of index $n_2$. In the case of using an electrooptical material defining with the laser material a single cavity, it is consequently possible to reduce the necessary distance between the contact electrodes (28, 30 in FIG. 4 and 38, 40 in FIG. 5) to obtain the field E necessary for the modulation of the index $n_2$. The voltage to be applied to the electrodes to obtain the same field E is reduced as a consequence thereof. Moreover, in the case where the switching of the laser is obtained by modulating $n_2$ with the aid of an external control voltage, the relations between w, g and n being linear and the cavities being defined in the maximum sensitivity area, a small relative variation of $n_2$ of approximately $10^{-4}$ is sufficient for tuning the cavity around the stability limit.

In the case where it would be difficult to adjust the thicknesses $L_1$ and $L_2$ with a precision of $10^{-4}$ (i.e. a 0.1 $\mu$m thickness control in the case of microlasers), it is necessary to adjust these lengths prior to switching, either by applying a continuous electric field, or by regulating the cavity temperature, or by any other mechanical means (e.g. piezoelectric effect). This length adjustment makes it possible to define the off state of the laser, e.g. by adjusting the cavity to an unstable state. As from this initial state, it is sufficient in the case where the second material is of the electrooptical type to apply a rapid electric field pulse in order to rapidly modulate $n_2$, so as to stabilize the cavity and obtain a laser pulse.

All that has been described hereinbefore is also applicable to the case of a microlaser cavity and to the general case of a laser cavity installed at the stability limit and whose optical length is adjusted so as to pass it from an unstable state to a stable state.

It is also possible to reverse the positions of the active laser medium and the second medium of index n, the latter then being on the side of the input mirror. There is still only one cavity, each of the two media still ensuring the same function.

With regards to lasers having a "macroscopic" size (as opposed to microlasers), the stages for the production of a cavity such as are e.g. described in conjunction with FIGS. 4, 5, 7 to 10 are known to the expert. The two media of index $n_1$ and $n_2$ takes place by bonding or molecular adhesion. The deposition of an antireflection layer at the interface of the two materials is known, as is the deposition of reflecting layers for forming the input and output mirrors having geometrical properties of desired type (radii of curvature) making it possible to define a cavity at the stability limit. For example, the input face of the material traversed first by the pumping beam (active laser medium in FIGS. 4 and 5) can be polished with the desired radius of curvature. The direct deposition of the mirrors on materials contained in the cavity makes it possible to render the latter compact and therefore solve the deregulation problem during use.

A process for the production of a microlaser according to the invention having an active laser medium and an electrooptical material, will now be described. This process involves stages 1) to 15).

Figure 11A:
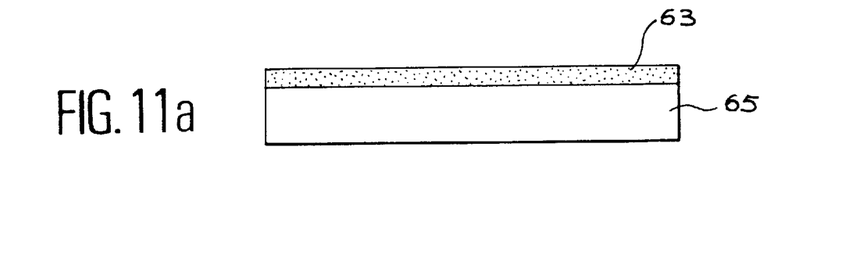
FIGS. 11a to 11e Stages in the formation of microlenses on a solid, active laser medium for a microlaser according to the present invention.
Figure 11B:
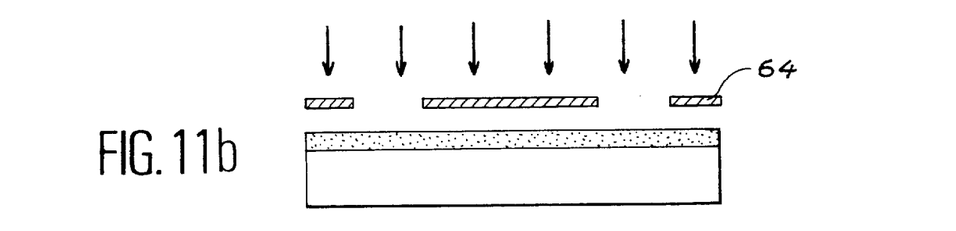
Figure 11C:
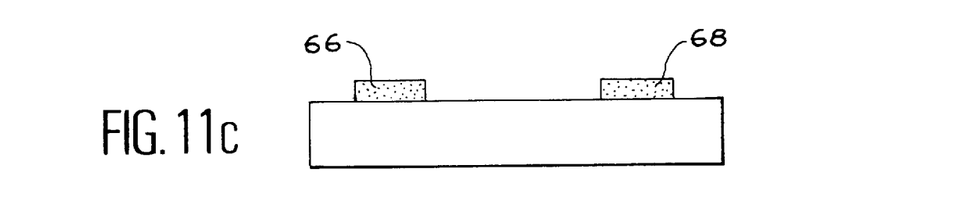
Figure 11D:
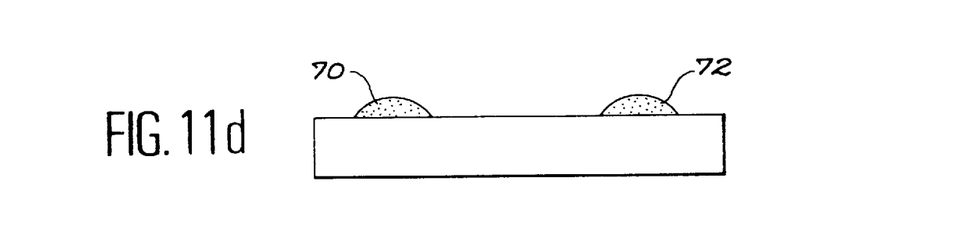
Figure 11E:
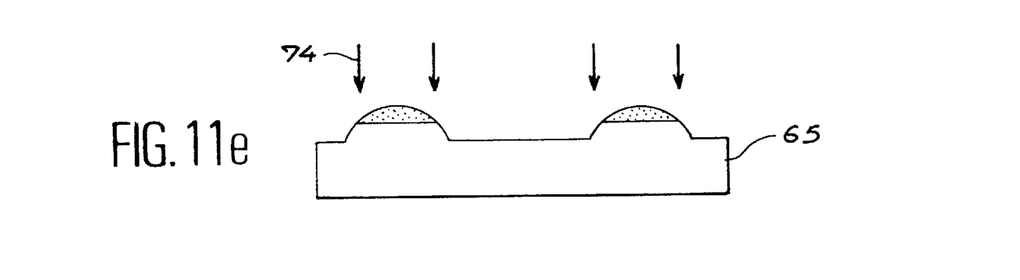

1) In a first stage, a calculation takes place of the radii of curvature and the lengths of the different media of indices $n_1$ and $n_2$, so as to be at the cavity stability limit.
2) In a second stage there is a cutting and double face polishing of a laser material plate and optionally a plate of material of index $n_2$, such as an electrooptical material, e.g. LiTaO$_3$.
3) Production then takes place by photolithography and machining of a microlens on the input face of the laser material (typical diameter 100 to 500 $\mu$m and radius of curvature $R_1$ of 1 to 2 mm). This stage is illustrated in FIGS. 11a to 11e. In a first substage (FIG. 11a), a photosensitive resin layer 63 is deposited on the input face of the laser material 65, followed by the irradiation of the resin through a mask 64 using UV radiation (FIG. 11b). The following stage (FIG. 11c) consists of the chemical development of the resin, only leaving the blocks 66, 68 for forming the microlenses. This is followed by the hot flow or bonding of the resin (FIG. 11d) to form the resin microlenses 70, 72, followed by the machining of the laser material 65 with the aid of an ion beam 74 (FIG. 11e).

Figure 12A:
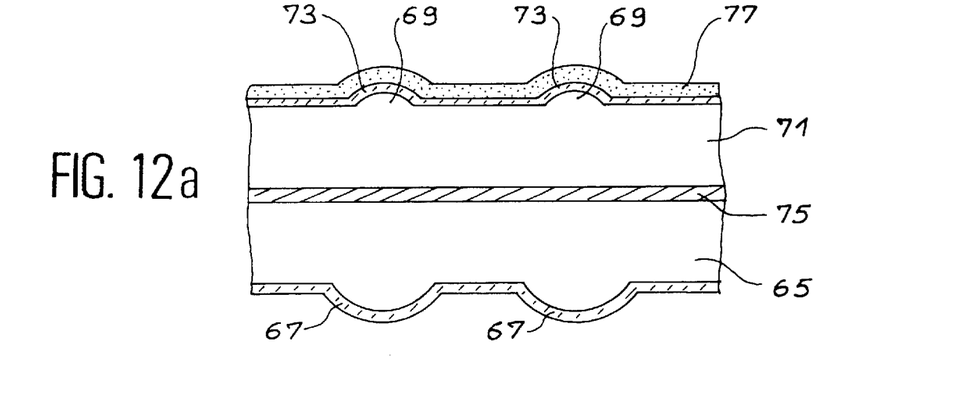
FIGS. 12a to 12c Other stages in the production of microlasers according to the invention.

Stages 4) to 9) will now be described in conjunction with FIG. 12a.

4) The input mirror 67 is deposited on the input face of the laser material 65 (e.g. for the dichroic input mirror with a reflectivity exceeding 99.5% at the wavelength of the laser beam and a transmission exceeding 80% at the wavelength of the pumping beam).

5) This is followed by the production by photolithography and machining of microlenses 69 on the output surface of the electrooptical material 71 (typical diameter 100 to 500 µm and radius of curvature $R_2$ of 1 to 2 mm). In the case where the output mirror is a planar mirror, there is no microlens formation on the output face of the electrooptical material. Moreover, the diameter of the output mirror (microlens) can be less than the diameter of the input mirror (microlens).

6) This is followed by the deposition of the output mirror 73 on the output face of the electrooptical material 71 (output mirror with a typical reflectivity of 85 to 99% at the wavelength of the laser beam and optionally with a reflectivity exceeding the wavelength of the pumping beam in order to reflect the pumping beam which is not totally absorbed on the first passage).

7) In the seventh stage, an antireflection layer 75 is deposited at the interface between the laser material 65 and electrooptical material 71. This layer can be deposited either on the planar output face of the laser material 65, or on the planar input face of the electroptical material 71. This deposit is not indispensable for the operation of the system.

8) The two plates are then bonded with the aid of an optical adhesive or assembly by any other process, e.g. molecular adhesion.

9) The output face can be protected by a resin deposit 77.

10) It is possible to make grooves 79 (FIG. 12b) in the electrooptical material with the aid of a diamond blade saw used in microelectronics so as to be able to subsequently produce the electrodes with the desired spacing of approximately 100 µm, compared with an interelectrode distance of 1 mm in the prior art).

Figure 12B:
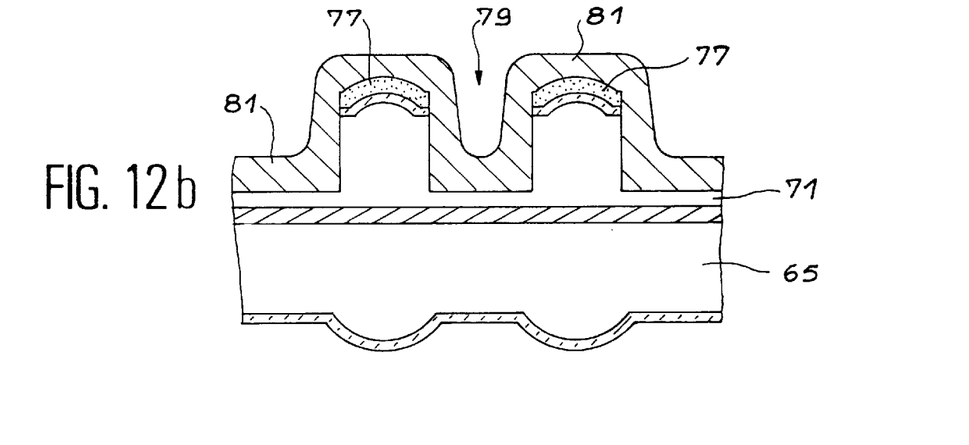

11) This is followed by the deposition of electric contacts by evaporation (e.g. deposition of a Cr—Au layer 81 surrounding the resin 77 and the electrooptical material 71).

Figure 12C:
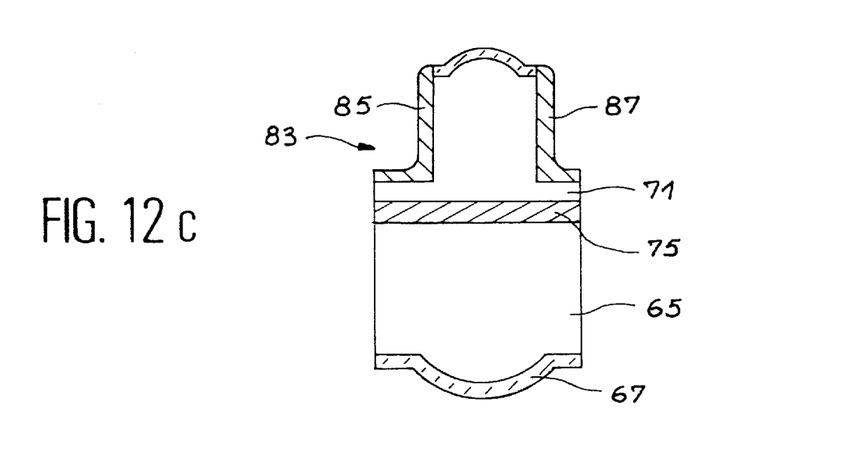

12) This is followed by the etching of the protective resin (FIG. 12c).

13) Elementary chips 83 of approximately size 1 mm² are then cut in the manner illustrated in FIG. 12c, where references 85 and 87 designate the control electrodes of the electrooptical material 71.

14) The chips are fitted on a metallized printed circuit support and impedance matched, with electrical contacting and fitting in a metal-clad box.

15) Fitting in the box can then take place, accompanied by the connection to a laser pumping diode and an electrical connector for switching purposes.

Figure 13:
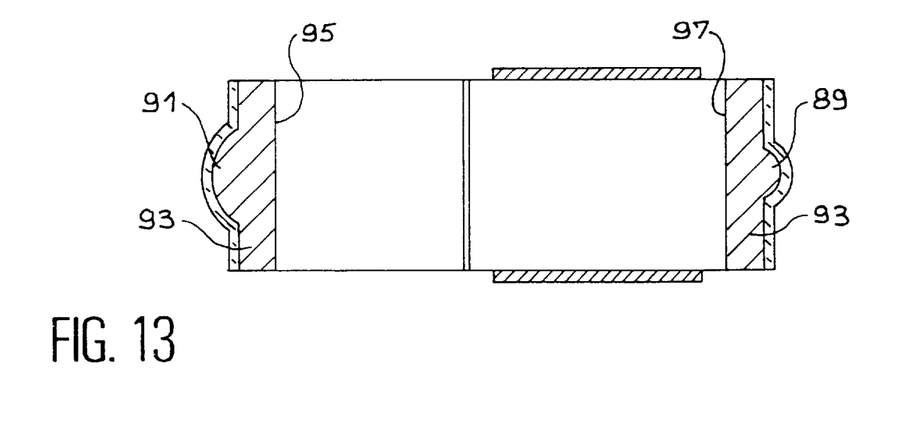
FIG. 13 Another embodiment of a microlaser cavity according to the present invention.

According to a variant, it is possible to manufacture the microlenses with a variable density mask. Moreover, as shown in FIG. 13, microlenses 89, 91 can be produced on a material 93 such as glass or silica, which is transparent at the wavelength of the laser. These substrates with the microlenses can then be joined to the input 95 and output 97 faces of the microlaser. The structure obtained is illustrated in FIG. 13.

It is also possible to use all known types of solid laser materials (crystals or glasses). In particular, the wavelength will be determined as a function of active ions, around 1 µm for Nd and Yb, 1.55 µm for Er and Er+Yb and 2 µm for Tm and Ho. The spectral characteristics of the mirrors will be chosen on the one hand as a function of the wavelengths and on the other as a function of the microlaser switching characteristics. In the case where the second material of index $n_2$ is an electrooptical material, all known electrooptical or semiconductor materials making it possible to obtain the variation of the optical length by a control voltage can be used for producing the second cavity. These materials will be chosen as a function of the wavelength and as a function of their electrooptical properties. As stated hereinbefore, it is also possible to choose materials, whose index varies as a function of a magnetic field or in response to an incident laser beam, or in response to a pressure or temperature variation.

Advantages resulting from a laser or microlaser cavity according to the invention have been mentioned hereinbefore, a novel active switching type being proposed, making it possible to develop simpler laser systems.

Moreover, with regards to microlasers, the invention makes it possible to reduce the size of the variable index medium $n_2$, so that the microlaser size can, or need not be reduced. In the case of an electrooptical material, the interelectrode distance can be brought to 100 µm, as compared with approximately 1 mm in the prior art. Therefore a much higher switching voltage is necessary. Moreover, the microlaser is monolithic and can be manufactured by collective methods of the types used in microelectronics and which make it possible to produce low cost microlaser means.

We claim:

1. Microlaser cavity incorporating an active laser material and two mirrors forming a hemispherical, or confocal, or concentric, or spherical Fabry Perot cavity at the optical stability limit, a second material of variable optical length and means for varying the optical length of the cavity so as to permit a passage from an optically unstable state to an optically stable state.

2. Microlaser cavity according to claim 1, the two materials being juxtaposed, or bonded to one another, or in contact with one another by molecular adhesion.

3. Microlaser cavity according to claim 2, an antireflection layer being deposited at the interface of the two materials.

4. Microlaser cavity according to claim 1 wherein the means for varying the optical length of the cavity includes means for varying the length of the second material.

5. Microlaser cavity according to claim 2 wherein the means for varying the optical length of the cavity includes means for varying the length of the second material.

6. Microlaser cavity according to claim 1 wherein the two materials have different optical indices and the means for varying the optical length of the cavity has means for varying the optical index of the second material.

7. Microlaser cavity according to claim 2 wherein the two materials have different optical indices and the means for varying the optical length of the cavity has means for varying the optical index of the second material.

8. Microlaser cavity according to claim 1, the second material being an electrooptical material.

9. Microlaser cavity according to claim 1, wherein the index of the second material is varied by a temperature variation.

10. Microlaser cavity according to claim 1, wherein the index of the second material is varied by a pressure variation.

11. Microlaser cavity according to claim 1, the second material being a magnetooptical material.

12. Microlaser cavity according to claim 1, the second material being an optically non-linear material (57).

13. Microlaser having a cavity according to claim 1 further including optical cavity pumping means.

14. Microlaser cavity incorporating an active laser material and two mirrors forming a hemispherical, or confocal, or concentric, or spherical Fabry Perot cavity at the optical stability limit, the length of the cavity being adjustable with the aid of piezoelectric means making it possible to vary the position of at least one of the two mirrors of the cavity, in order to pass the latter from an optically unstable state to an optically stable state.

15. Microlaser having a cavity according to claim 14 further including optical cavity pumping means.

* * * * *